(12) United States Patent
Rofougaran et al.

(10) Patent No.: US 7,856,247 B2
(45) Date of Patent: *Dec. 21, 2010

(54) RFID READER INTEGRATED WITH WIRELESS COMMUNICATION DEVICE

(75) Inventors: Ahmadreza (Reza) Rofougaran, Newport Coast, CA (US); Kambiz Shoarinejad, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 12/345,840

(22) Filed: Dec. 30, 2008

(65) Prior Publication Data

US 2009/0111516 A1    Apr. 30, 2009

Related U.S. Application Data

(63) Continuation of application No. 11/377,814, filed on Mar. 16, 2006, now Pat. No. 7,477,917.

(60) Provisional application No. 60/778,523, filed on Mar. 2, 2006.

(51) Int. Cl.
*H04M 1/00* (2006.01)
*H04K 3/00* (2006.01)

(52) U.S. Cl. .................. 455/552.1; 455/11.1; 455/41.2

(58) Field of Classification Search ................ 455/11.1, 455/41.1–41.3, 61, 552.1–553.1, 556.1; 340/10.1–10.2, 340/572.1

See application file for complete search history.

(56) References Cited

U.S. PATENT DOCUMENTS

| 4,660,192 | A  | * | 4/1987 | Pomatto, Sr. ................. 370/204 |
| 7,477,917 | B2 | * | 1/2009 | Rofougaran et al. ...... 455/552.1 |
| 7,570,920 | B2 | * | 8/2009 | Posamentier ................. 455/61 |
| 2005/0096084 | A1 | * | 5/2005 | Pohja et al. .............. 455/556.1 |

* cited by examiner

*Primary Examiner*—Lee Nguyen
(74) *Attorney, Agent, or Firm*—Garlick Harrison & Markison; Holly L. Rudnick

(57) ABSTRACT

An integrated RFID reader and wireless communication device is realized by a radio frequency (RF) front end operable, in a first mode, to generate a radio frequency identification system (RFID) outbound radio frequency (RF) signal, to receive an RFID inbound RF signal responsive to the RFID outbound RF signal and to convert the RFID inbound RF signal to an RFID near baseband signal, and operable in a second mode, to generate a transceiver outbound radio frequency (RF) signal, to receive a transceiver inbound RF signal and to convert the transceiver inbound RF signal to a transceiver near baseband signal. The integrated device further includes a digitization module operable, in the first mode, to convert the RFID near baseband signal to an RFID digital baseband signal, and operable, in a second mode, to convert the transceiver near baseband signal to a transceiver digital baseband signal, and a baseband processing module operably coupled, in the first mode, to convert the RFID digital baseband signal into inbound RFID digital data, and operably coupled, in the second mode, to convert the transceiver digital baseband signal into inbound transceiver digital data.

16 Claims, 15 Drawing Sheets

RFID READER INTEGRATED WITH WIRELESS COMMUNICATION DEVICE

CROSS REFERENCE TO RELATED APPLICATIONS

The present U.S. Patent Application claims priority pursuant to 35 U.S.C. §120 as a continuation to U.S. application Ser. No. 11/377,814, entitled, RFID Reader Integrated with Wireless Communication Device,", filed Mar. 16, 2006, pending, which is hereby incorporated herein by reference in its entirety and made part of the present U.S. Patent Application for all purposes.

U.S. application Ser. No. 11/377,814 claims priority pursuant to 35 U.S.C. §119(e) to U.S. Provisional Patent Application Ser. No. 60/778,523, filed Mar. 2, 2006.

The present U.S. Patent Application is further related by subject matter to the following U.S. Patent Applications filed on Mar. 16, 2006, the contents of which are expressly incorporated herein in their entirety by reference thereto:

1. WIRELESS COMMUNICATION DEVICE WITH RFID READER, having Ser. No. 60/778,524; and
2. TRANSCEIVER AND METHOD FOR COMBINING RFID AMPLITUDE-MODULATED DATA WITH WIRELESS PHASE-MODULATED DATA, having Ser. No. 60/778,529.

BACKGROUND OF THE INVENTION

1. Technical Field of the Invention

This invention is related generally to wireless communication systems, and more particularly to wireless communication devices facilitating radio-frequency identification (RFID).

2. Description of Related Art

A radio frequency identification (RFID) system generally includes a reader, also known as an interrogator, and a remote tag, also known as a transponder. Each tag stores identification data for use in identifying a person, article, parcel or other object. RFID systems may use active tags that include an internal power source, such as a battery, and/or passive tags that do not contain an internal power source, but instead are remotely powered by the reader.

Communication between the reader and the remote tag is enabled by radio frequency (RF) signals. In general, to access the identification data stored on an RFID tag, the RFID reader generates a modulated RF interrogation signal designed to evoke a modulated RF response from a tag. The RF response from the tag includes the coded identification data stored in the RFID tag. The RFID reader decodes the coded identification data to identify the person, article, parcel or other object associated with the RFID tag. For passive tags, the RFID reader also generates an unmodulated, continuous wave (CW) signal to activate and power the tag during data transfer.

RFID systems typically employ either far-field technology, in which the distance between the reader and the tag is great compared to the wavelength of the carrier signal, or near-field technology, in which the operating distance is less than one wavelength of the carrier signal, to facilitate communication between the RFID reader and RFID tag. In far-field applications, the RFID reader generates and transmits an RF signal via an antenna to all tags within range of the antenna. One or more of the tags that receive the RF signal responds to the reader using a backscattering technique in which the tags modulate and reflect the received RF signal. In near-field applications, the RFID reader and tag communicate via mutual inductance between corresponding reader and tag inductors.

Current RFID readers are formed of separate and discrete components whose interfaces are well-defined. For example, an RFID reader may consist of a controller or microprocessor implemented on a CMOS integrated circuit and a radio implemented on one or more separate CMOS, BiCMOS or GaAs integrated circuits that are uniquely designed for optimal signal processing in a particular technology (e.g., near-field or far-field). However, the high cost of such discrete-component RFID readers has been a deterrent to wide-spread deployment of RFID systems.

For example, in some applications, it may be desirable to wirelessly communicate RFID data captured by an RFID reader to a computer, server or network device for centralized storage, verification and/or analysis of the RFID data. There are a number of well-defined wireless communication standards (e.g., IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof) that could facilitate such wireless communication between an RFID reader and a network device. However, due to the high cost of RFID readers, RFID technology has not been integrated into existing wireless communication devices, such as a cellular telephone, two-way radio, personal digital assistant (PDA), personal computer (PC), laptop computer, home entertainment equipment and other similar handheld wireless communication devices.

Therefore, a need exists for a wireless communication device that incorporates a low-cost RFID reader. In addition, a need exists for a wireless communication device capable of communicating RFID data over a communication network.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

Figure 10A:
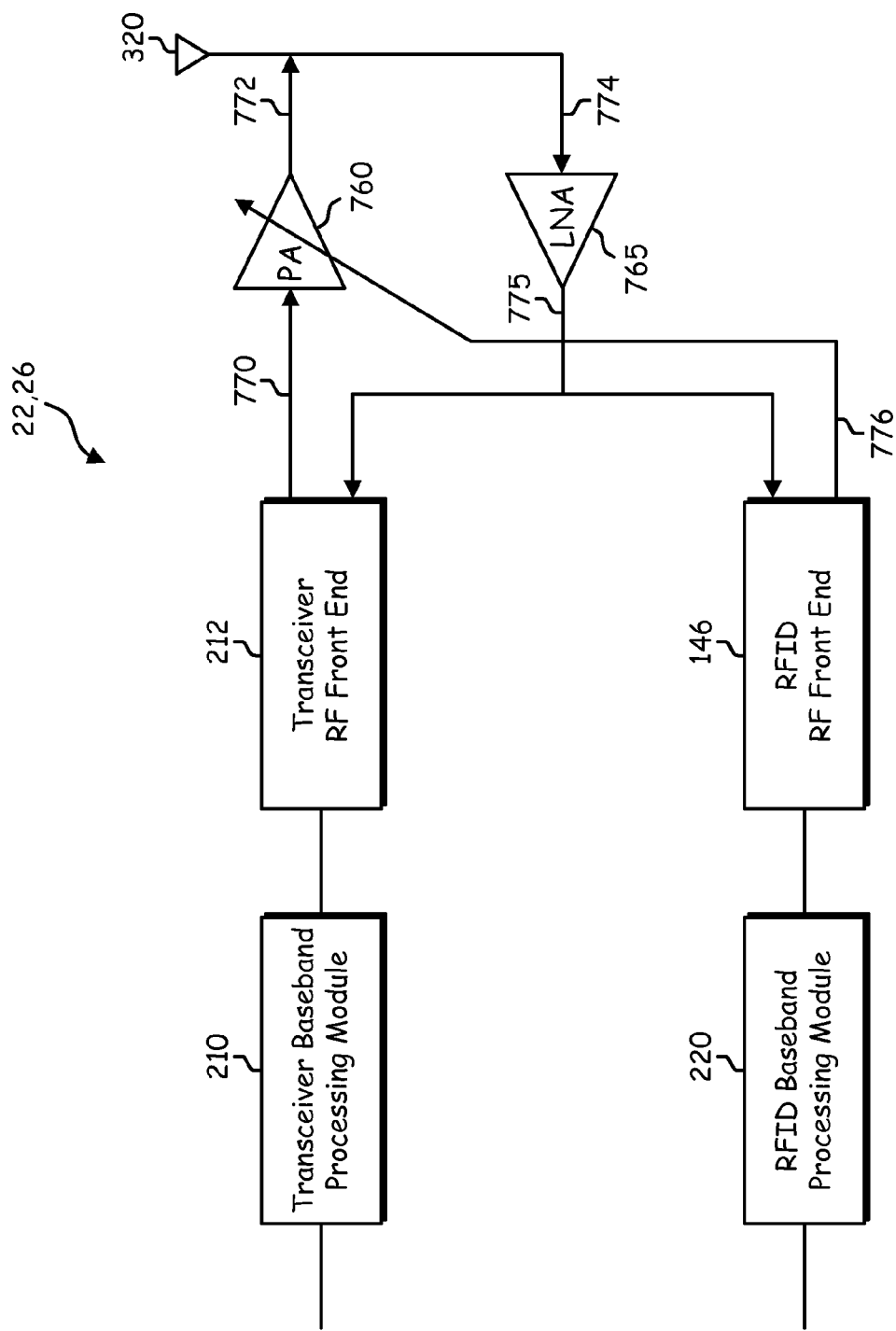
FIG. 10A is a schematic block diagram illustrating an exemplary wireless communication device capable of simultaneously operating in transceiver mode and RFID mode using a shared antenna architecture in accordance with the present invention.
Figure 10B:
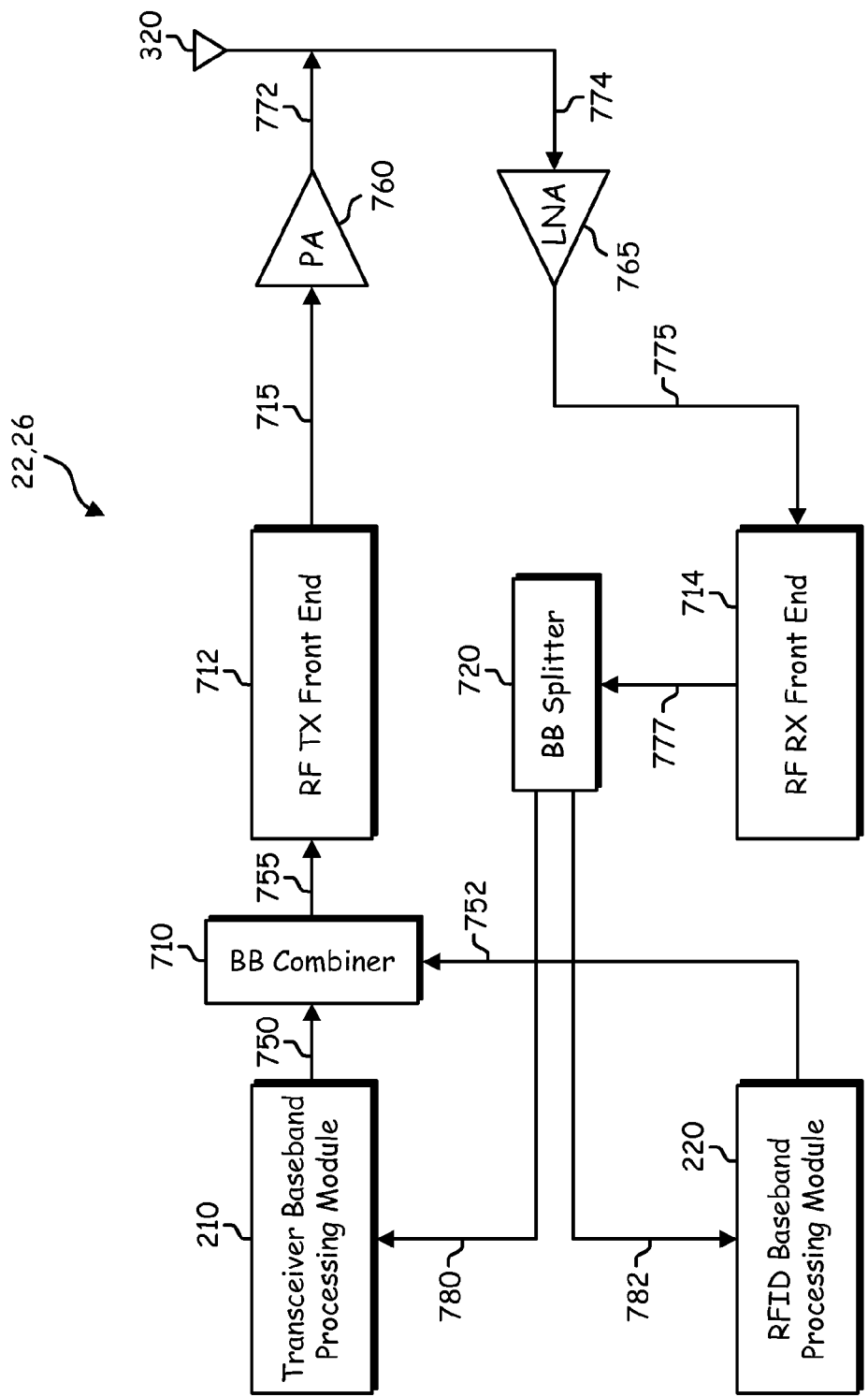
FIG. 10B is a schematic block diagram illustrating another exemplary wireless communication device capable of simultaneously operating in transceiver mode and RFID mode using a shared antenna architecture in accordance with the present invention.
Figure 10C:
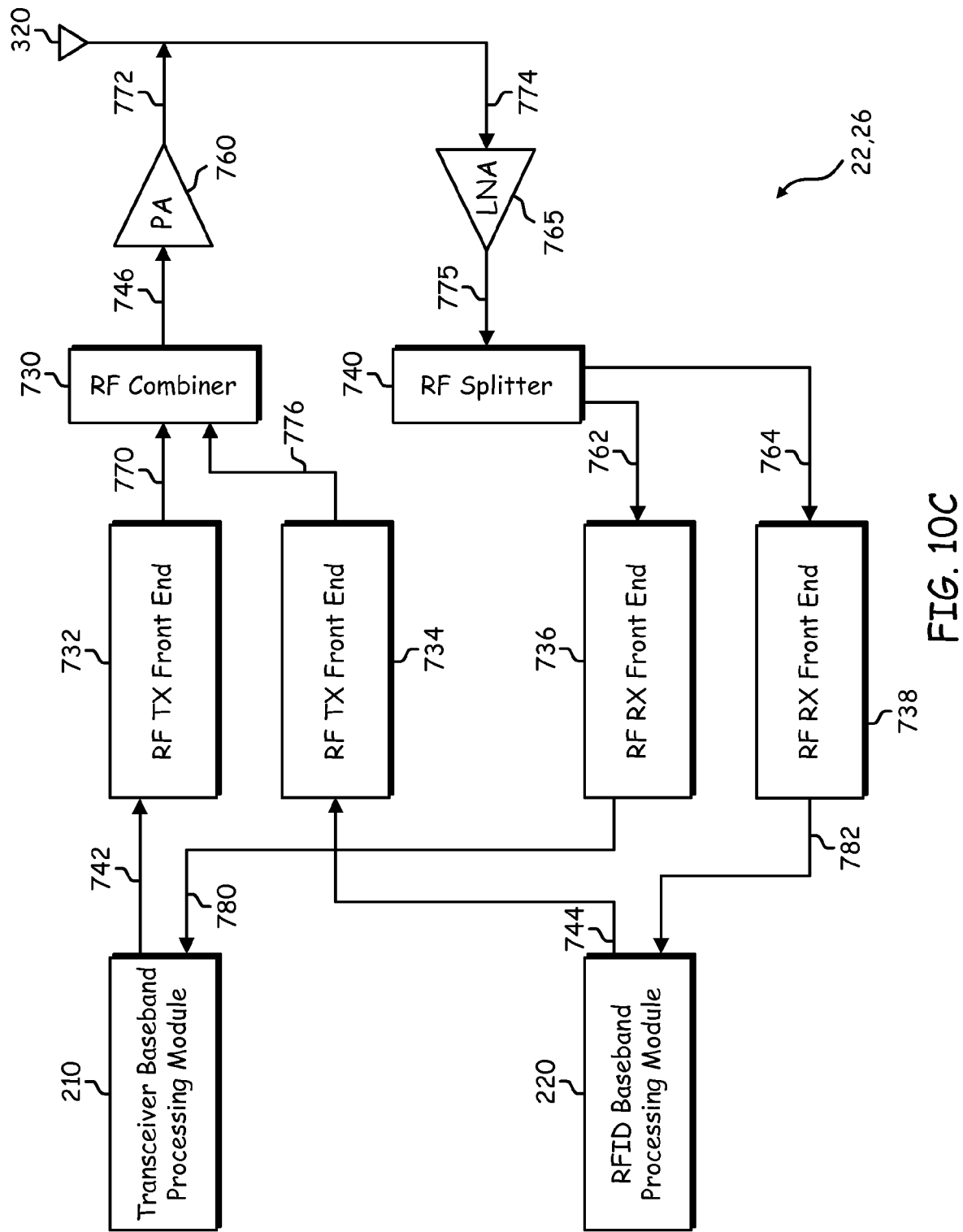
FIG. 10C is a schematic block diagram illustrating yet another exemplary wireless communication device capable of simultaneously operating in transceiver mode and RFID mode using a shared antenna architecture in accordance with the present invention.
Figure 10D:
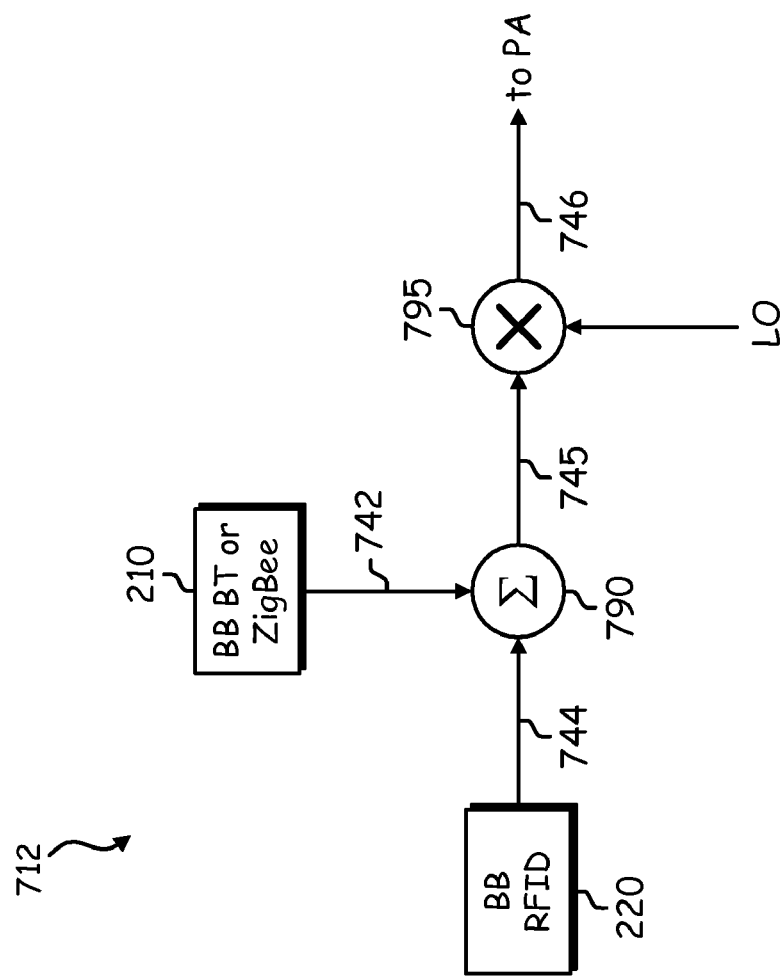
Figure 11:
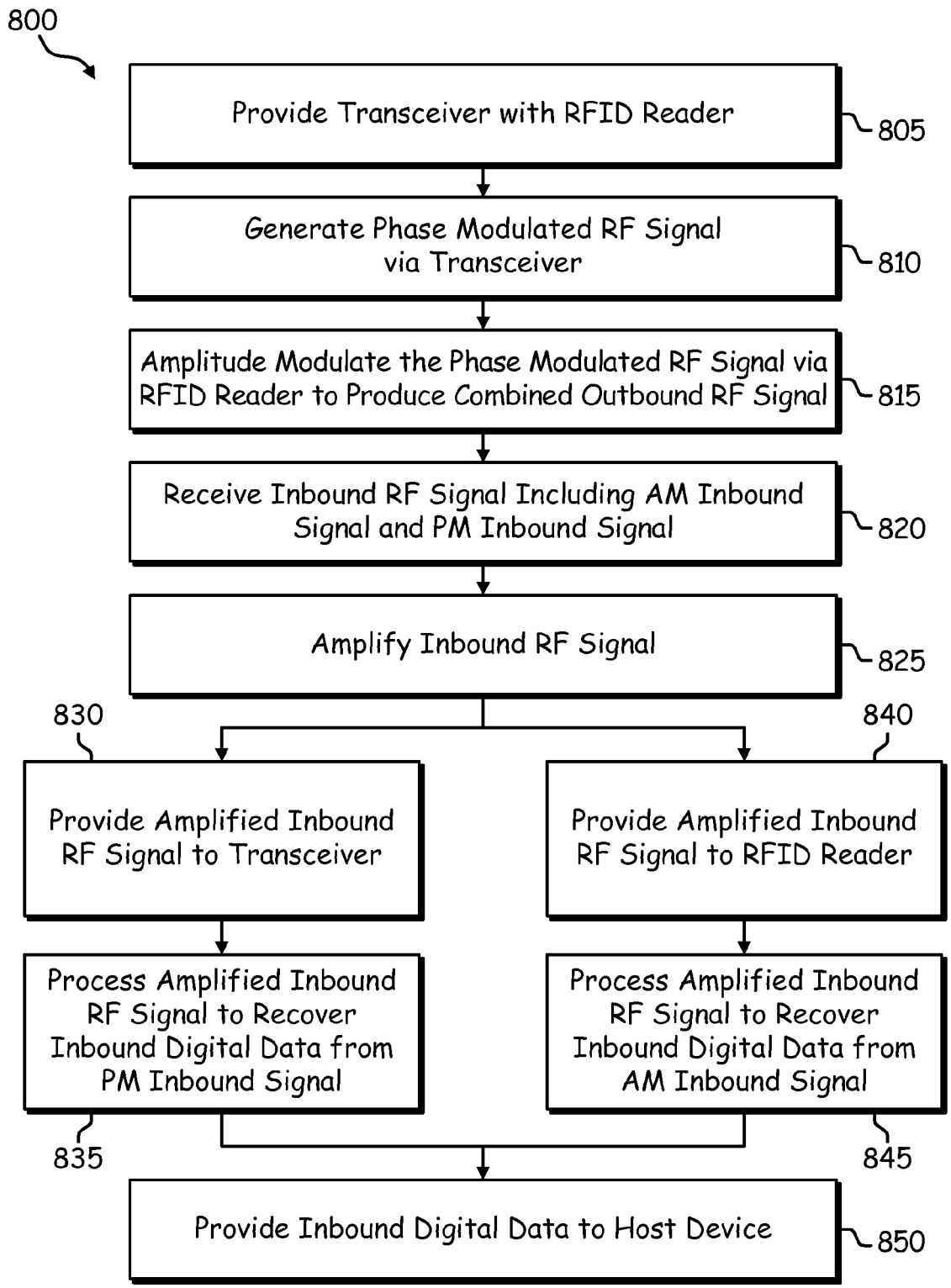

FIG. 10D is a schematic block diagram illustrating an exemplary RF front end capable of simultaneously operating in transceiver mode and RFID mode using a shared antenna architecture in accordance with the present invention; and FIG. 11 is a logic diagram of a method for simultaneously operating the wireless communication device in transceiver mode and RFID mode in accordance with the present invention.

DETAILED DESCRIPTION OF THE INVENTION

Figure 1:
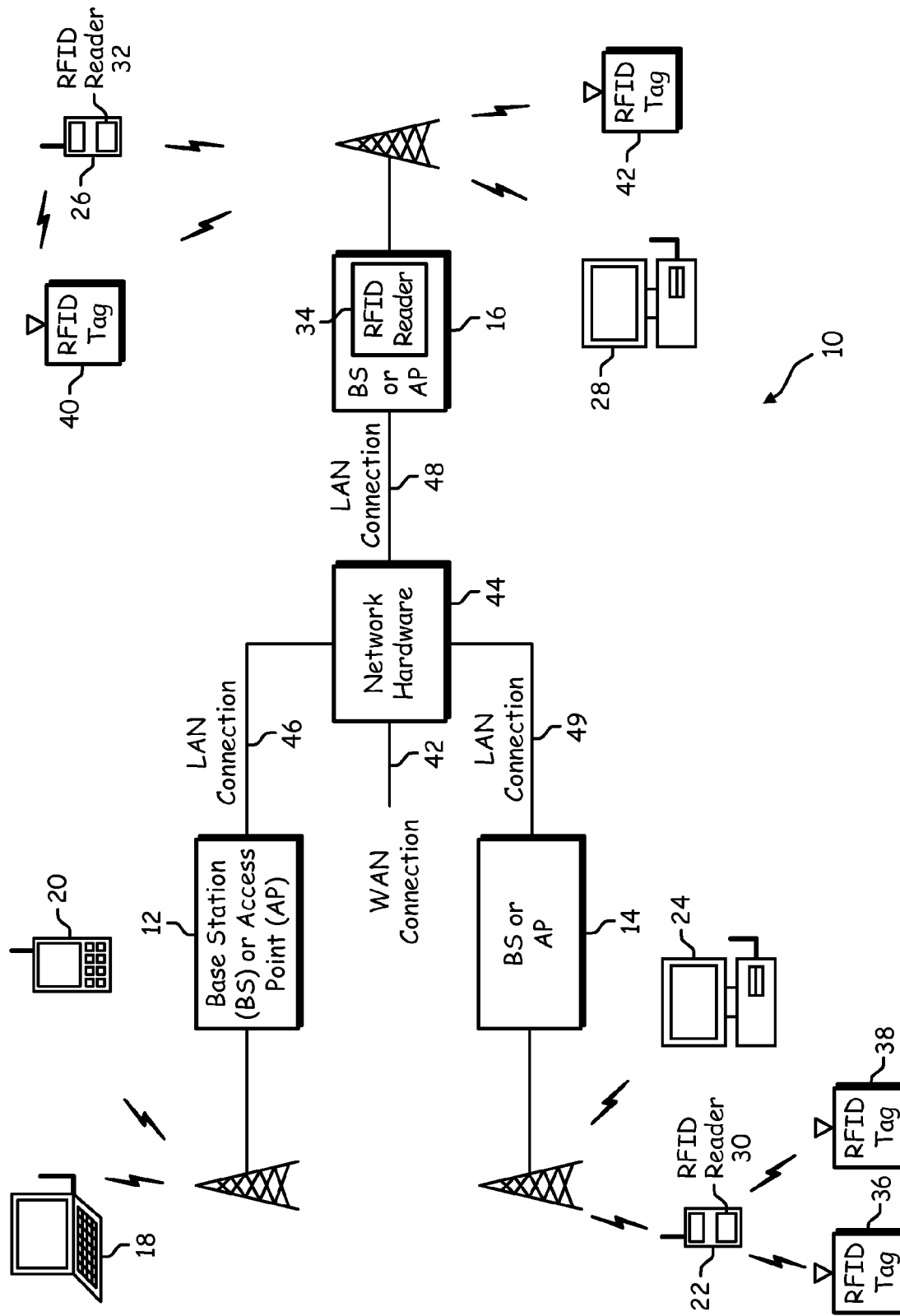
FIG. 1 is a schematic block diagram illustrating a communication system that includes a plurality of base stations or access points (APs), a plurality of wireless communication devices incorporating RFID readers and a network component in accordance with the present invention.

FIG. 1 is a schematic block diagram of FIG. 1 is a functional block diagram illustrating a communication system 10 that includes a plurality of base stations or access points (APs) 12-16, a plurality of wireless communication devices 18-28 and a network hardware component 44. The wireless communication devices 18-28 may be laptop computers 18, personal digital assistants 20, personal computers 24 and 28 and/or cellular telephones 22 and 26.

Wireless communication devices 22 and 26 each include a radio frequency identification (RFID) reader 30 and 32, respectively. Each RFID reader 30 and 34 wirelessly communicates with one or more RFID tags 36-40 within its coverage area. For example, RFID tags 36 and 38 may be within the coverage area of RFID reader 30, and RFID tag 40 may be within the coverage area of RFID reader 32. In one embodiment, the RF communication scheme between the RFID readers 30 and 32 and RFID tags 36-40 is a backscatter technique whereby the RFID readers 30 and 32 request data from the RFID tags 36-40 via an RF signal, and the RF tags 36-40 respond with the requested data by modulating and backscattering the RF signal provided by the RFID readers 30 and 32. In another embodiment, the RF communication scheme between the RFID readers 30 and 32 and RFID tags 36-40 is an inductance technique whereby the RFID readers 30 and 32 magnetically couple to the RFID tags 36-40 via an RF signal to access the data on the RFID tags 36-40. In either embodiment, the RFID tags 36-40 provide the requested data to the RFID readers 30 and 32 on the same RF carrier frequency as the RF signal. The details of the wireless communication devices and associated RFID readers will be described in greater detail with reference to FIGS. 2-9.

The base stations or APs 12-16 are operably coupled to the network hardware component 44 via local area network (LAN) connections 46-49. The network hardware component 44, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices 18-28 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. For example, access points are typically used in Bluetooth systems. Regardless of the particular type of communication system, each wireless communication device and each of the base stations or access points includes a built-in radio and/or is coupled to a radio. The radio includes a transceiver (transmitter and receiver) for modulating/demodulating information (data or speech) bits into a format that comports with the type of communication system.

In addition to or as an alternative to including RFID readers within wireless communication devices, an RFID reader 34 can also be incorporated within a base station 16. As shown in FIG. 1, RFID reader 34 within base station 16 wirelessly communicates with one or more RFID tags 42 within its coverage area using a backscatter technique. The RFID collected by the RFID reader 34 may then be passed to the network hardware component 44 over LAN connection 48.

In this manner, the RFID readers 30-34 collect RFID data from each of the RFID tags 36-42 within its coverage area. The collected data may then be conveyed to the network hardware component 44 for further processing and/or forwarding of the collected data. For example, the RFID readers 30 and 32 incorporated within wireless communication devices 22 and 26 can provide the collected RFID data to the respective internal transceivers within wireless communication devices 22 and 26 to communicate the RFID data to the network hardware component 44 using any available wireless communication standard (e.g., IEEE 802.11x, Bluetooth, et cetera). In addition, and/or in the alternative, the network hardware component 44 may provide data to one or more of the RFID tags 36-42 via the associated RFID reader 30-34. Such downloaded information is application dependent and may vary greatly. Upon receiving the downloaded data, the RFID tag can store the data in a non-volatile memory therein.

The RFID tags 36-42 may each be associated with a particular object for a variety of purposes including, but not limited to, tracking inventory, tracking status, location determination, assembly progress, et cetera. The RFID tags may be active devices that include internal power sources or passive devices that derive power from the RFID readers 30-34.

As one of ordinary skill in the art will appreciate, the communication system 10 of FIG. 1 may be expanded to include a multitude of RFID readers 30-34 distributed throughout a desired location (for example, a building, office site, et cetera) where the RFID tags may be associated with equipment, inventory, personnel, et cetera. In addition, it should be noted that the network hardware component 44 may be coupled to an RFID server and/or other network device to provide wide area network coverage.

Figure 2:
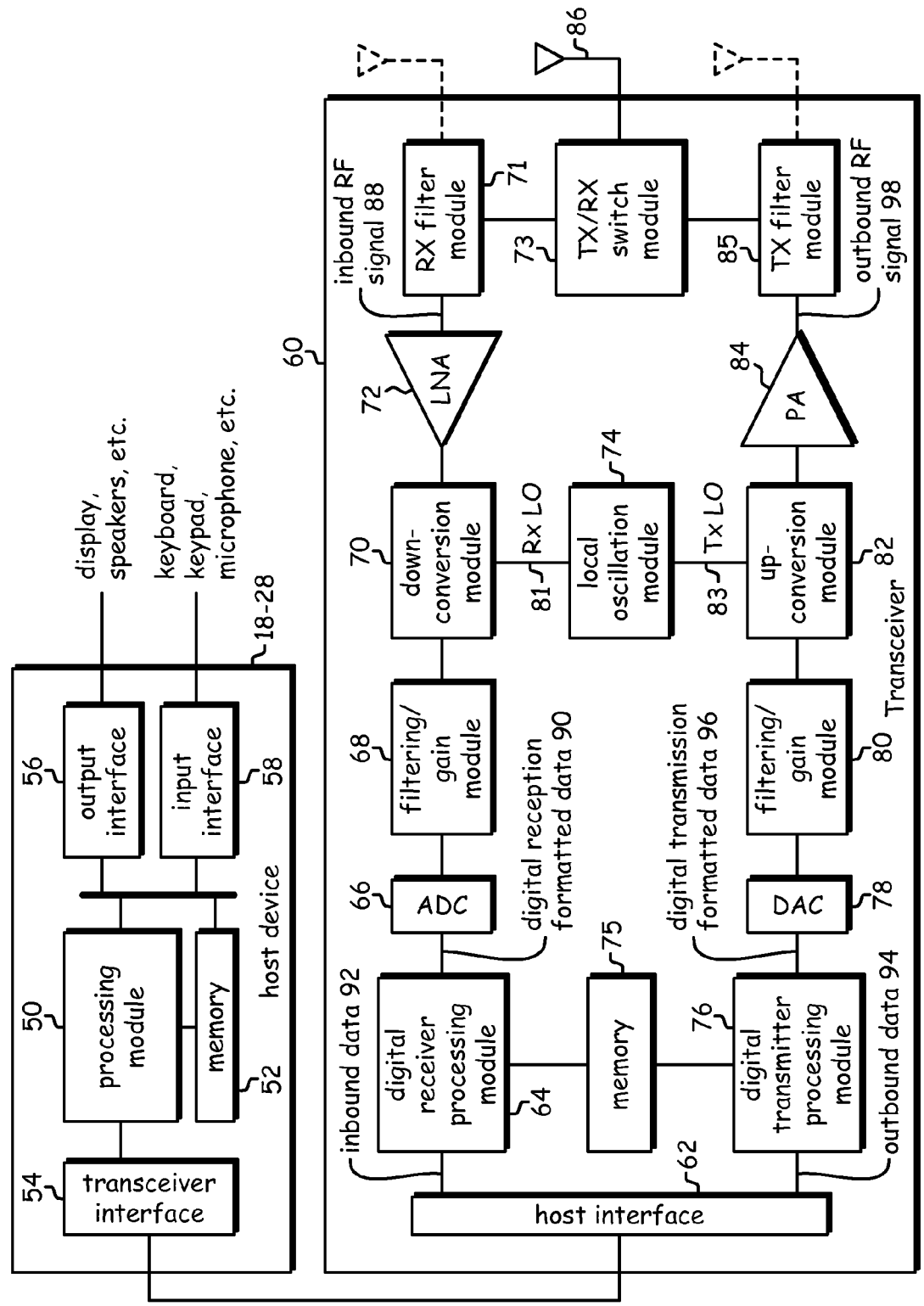
FIG. 2 is a schematic block diagram illustrating a wireless communication device as a host device and an associated transceiver.

FIG. 2 is a schematic block diagram illustrating a wireless communication device 18-28 as a host device and an associated transceiver 60. For cellular telephone hosts, the radio 60 is a built-in component. For personal digital assistants hosts, laptop hosts, and/or personal computer hosts, the transceiver 60 may be built-in or an externally coupled component.

As illustrated, the host wireless communication device 18-28 includes a processing module 50, a memory 52, a transceiver interface 54, an input interface 58 and an output interface 56. The processing module 50 and memory 52 execute instructions that are typically performed by the host device. For example, for a cellular telephone host device, the processing module 50 performs the corresponding communication functions in accordance with a particular cellular telephone standard.

The transceiver interface 54 allows data to be received from and sent to the transceiver 60. For data received from the transceiver 60 (e.g., inbound data), the transceiver interface 54 provides the data to the processing module 50 for further processing and/or routing to the output interface 56. The output interface 56 provides connectivity to an output device such as a display, monitor, speakers, etc., such that the received data may be displayed. The transceiver interface 54 also provides data from the processing module 50 to the transceiver 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the transceiver 60 via the transceiver interface 54.

Transceiver 60 includes a host interface 62, a digital receiver processing module 64, an analog-to-digital converter 66, a filtering/gain module 68, a down-conversion module 70, a low noise amplifier 72, receiver filter module 71, a transmitter/receiver (Tx/RX) switch module 73, a local oscillation module 74, a memory 75, a digital transmitter processing module 76, a digital-to-analog converter 78, a filtering/gain module 80, an IF mixing up-conversion module 82, a power amplifier 84, a transmitter filter module 85, and an antenna 86. The antenna 86 is shared by the transmit and receive paths as regulated by the Tx/Rx switch module 73. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, modulation. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the digital receiver processing module 64 and/or the digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 75 stores, and the digital receiver processing module 64 and/or the digital transmitter processing module 76 executes, operational instructions corresponding to at least some of the functions illustrated herein.

In operation, the transceiver 60 receives outbound data 94 from the host wireless communication device 18-28 via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, etc.) to produce digital transmission formatted data 96. The digital transmission formatted data 96 will be a digital baseband signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog baseband signal prior to providing it to the up-conversion module 82. The up-conversion module 82 directly converts the analog baseband signal, or low IF signal, into an RF signal based on a transmitter local oscillation 83 provided by local oscillation module 74. The power amplifier 84 amplifies the RF signal to produce an outbound RF signal 98, which is filtered by the transmitter filter module 85. The antenna 86 transmits the outbound RF signal 98 to a targeted device such as a base station, an access point and/or another wireless communication device.

The transceiver 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch module 73, where the Rx filter module 71 bandpass filters the inbound RF signal 88. The Rx filter module 71 provides the filtered RF signal to low noise amplifier 72, which amplifies the inbound RF signal 88 to produce an amplified inbound RF signal. The low noise amplifier 72 provides the amplified inbound RF signal to the down-conversion module 70, which directly converts the amplified inbound RF signal into an inbound low IF signal or baseband signal based on a receiver local oscillation signal 81 provided by local oscillation module 74. The down-conversion module 70 provides the inbound low IF signal or baseband signal to the filtering/gain module 68. The filtering/gain module 68 may be implemented in accordance with the teachings of the present invention to filter and/or attenuate the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by transceiver 60. The host interface 62 provides the recaptured inbound data 92 to the host wireless communication device 18-28 via the transceiver interface 54.

As one of average skill in the art will appreciate, the wireless communication device of FIG. 2 may be implemented using one or more integrated circuits. For example, the host device may be implemented on a first integrated circuit, while the digital receiver processing module 64, the digital transmitter processing module 76 and memory 75 are implemented on a second integrated circuit, and the remaining components of the transceiver 60, less the antenna 86, may be implemented on a third integrated circuit. As an alternate example, the transceiver 60 may be implemented on a single integrated circuit. As yet another example, the processing module 50 of the host device and the digital receiver processing module 64 and the digital transmitter processing module 76 may be a common processing device implemented on a single integrated circuit. Further, memory 52 and memory 75 may be implemented on a single integrated circuit and/or on the same integrated circuit as the common processing modules of processing module 50, the digital receiver processing module 64, and the digital transmitter processing module 76.

The wireless communication device of FIG. 2 is one that may be implemented to include either a direct conversion from RF to baseband and baseband to RF or for a conversion by way of a low intermediate frequency. Thus, while one embodiment of the present invention includes local oscillation module 74, up-conversion module 82 and down-conversion module 70 that are implemented to perform conversion between a low intermediate frequency (IF) and RF, it is understood that the principles herein may also be applied readily to systems that implement a direct conversion between baseband and RF.

Figure 3:
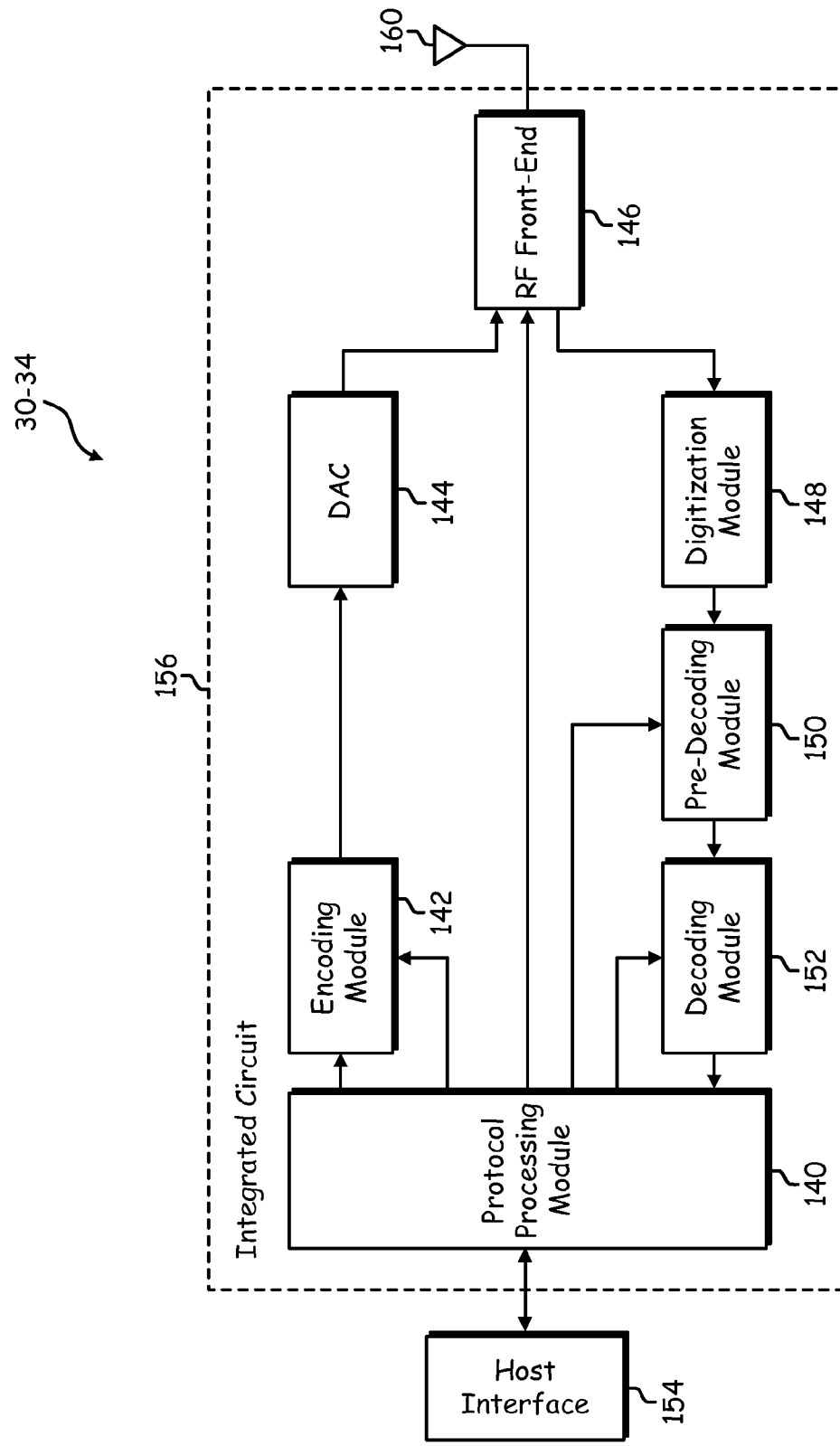
FIG. 3 is a schematic block diagram illustrating an exemplary RFID reader architecture in accordance with the present invention.

FIG. 3 is a schematic block diagram of an RFID reader 30-34 that includes an integrated circuit 156 and may further include a host interface module 154. The integrated circuit 156 includes a protocol processing module 140, an encoding module 142, a digital-to-analog converter (DAC) 144, an RF front-end 146, a digitization module 148, a predecoding module 150 and a decoding module 152, all of which together form the essential components of the RFID reader 30-34. In another embodiment, the DAC 144 is removed from the transmit path, and as such, the power amplifier in the RF front end 146 takes digital power control input. The host interface module 154 may include a communication interface to a host device, such as a cellular telephone or other wireless communication device.

The protocol processing module 140 is operably coupled to prepare data for encoding in accordance with a particular RFID standardized protocol. In an exemplary embodiment, the protocol processing module 140 is programmed with multiple RFID standardized protocols to enable the RFID reader 30-32 to communicate with any RFID tag, regardless of the particular protocol associated with the tag. In this embodiment, the protocol processing module 140 operates to program filters and other components of the encoding module 142, decoding module 152, pre-decoding module 150 and RF front end 146 in accordance with the particular RFID standardized protocol of the tag(s) currently communicating with the RFID reader 30-34.

In operation, once the particular RFID standardized protocol has been selected for communication with one or more RFID tags, the protocol processing module 140 generates and provides digital data to be communicated to the RFID tag to the encoding module 142 for encoding in accordance with the selected RFID standardized protocol. By way of example, but not limitation, the RFID protocols may include one or more line encoding schemes, such as Manchester encoding, FM0 encoding, FM1 encoding, etc. Thereafter, the encoded data is provided to the digital-to-analog converter 144 which converts the digitally encoded data into an analog signal. The RF front-end 146 modulates the analog signal to produce an RF signal at a particular carrier frequency that is transmitted via antenna 160 to one or more RFID tags.

Upon receiving an RF signal from one or more RFID tags, the RF front-end 146 converts the received RF signal into a baseband signal. The digitization module 148, which may be a limiting module or an analog-to-digital converter, converts the received baseband signal into a digital signal. The predecoding module 150 converts the digital signal into an encoded signal in accordance with the particular RFID protocol being utilized. The encoded data is provided to the decoding module 152, which recaptures data therefrom in accordance with the particular encoding scheme of the selected RFID protocol. The protocol processing module 140 processes the recovered data to identify the object(s) associated with the RFID tag(s) and/or provides the recovered data to the host device, as described in more detail below in connection with FIGS. 4 and 5, for further processing.

In an exemplary operation involving passive RFID tags, the RFID reader 30-34 first transmits an unmodulated, continuous wave (CW) RF signal to activate and provide power to all passive tags within the range of the antenna 160. The protocol processing module 140 controls the timing of the CW transmission to ensure that the CW transmission is long enough to enable the tags to receive and decode a subsequent interrogation signal from the RFID reader 30-34 and to generate a response thereto. Thereafter, the RFID reader 30-34 generates and transmits an amplitude-modulated (AM) RF interrogation signal to the tags, requesting data from the RFID tags. After the AM signal has been transmitted for a predetermined length of time, the RF signal is again changed back to a CW signal to provide power to the tags and to allow backscattering of the signal by the tags with the requested data.

The RF front-end 146 may include filters, a frequency synthesizer or local oscillation module, power amplifiers, low noise amplifiers, up-conversion modules, down-conversion modules and other RF components, as desired. In addition, the RF front-end 146 may further include transmit blocking capabilities such that the energy of the transmitted RF signal does not substantially interfere with the receiving of a backscattered or other RF signal received from one or more RFID tags via the antenna 160. The antenna 160 may be a single antenna or an antenna array.

The processing module 140 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 140 implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry. Further note that, the memory element stores, and the processing module 140 executes, hard coded and/or operational instructions corresponding to at least some of the steps and/or functions illustrated in FIGS. 3-10 below.

By integrating the RFID reader 30-34 onto a single integrated circuit 156, the cost of the RFID reader 30-34 is significantly reduced, thereby enabling RFID reader technology to be implemented on a wireless communication device at low cost.

Figure 4A:
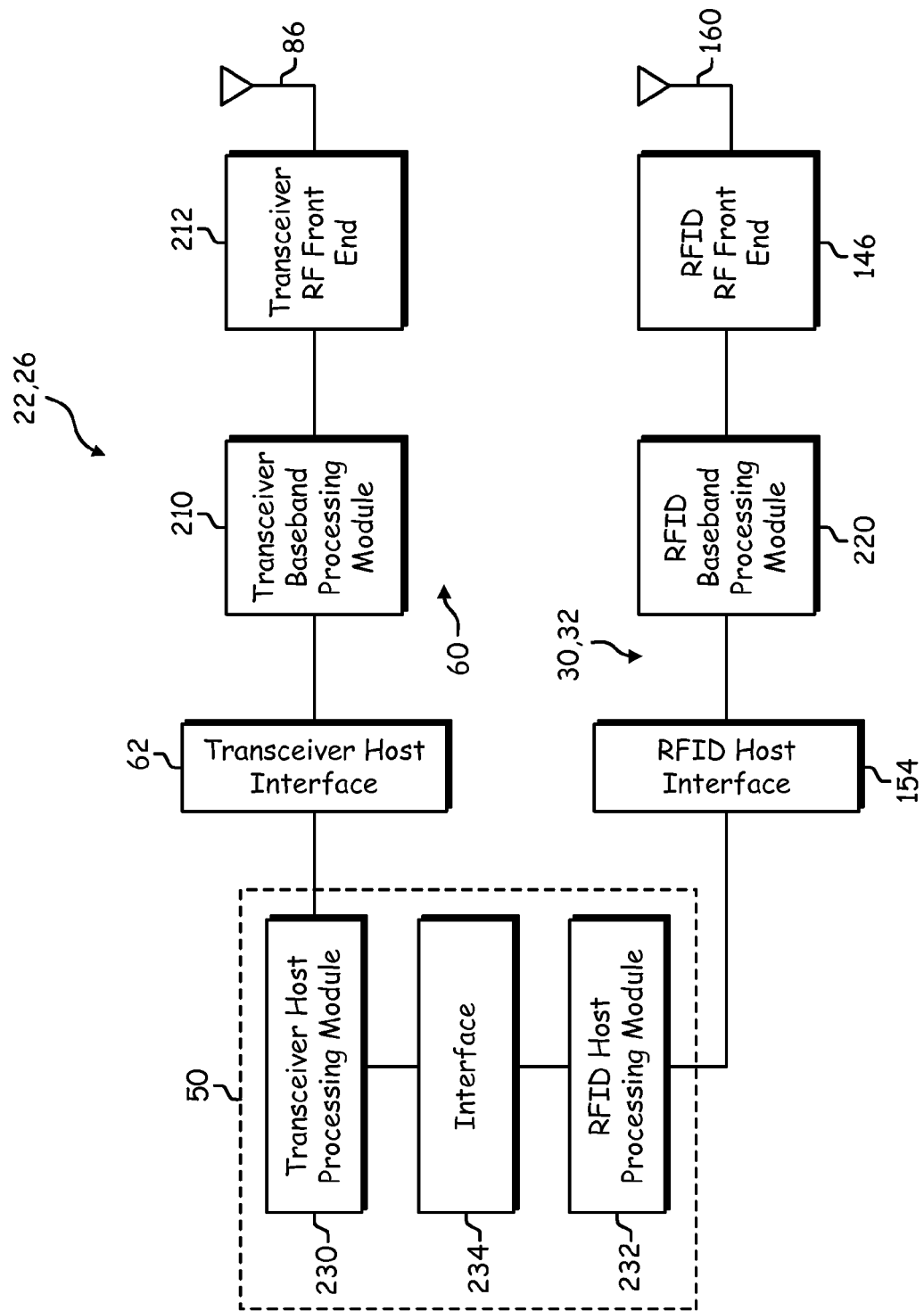
FIG. 4A is a schematic block diagram illustrating an exemplary wireless communication device incorporating both a transceiver and an RFID reader in accordance with the present invention.

Referring now to FIG. 4A, there is illustrated an exemplary wireless communication device 22, 26 incorporating both a transceiver 60 and an RFID reader 30, 32 in accordance with the present invention. The transceiver 60 includes antenna 86, a transceiver RF front-end 212, a transceiver baseband processing module 210 and a transceiver host interface 62. The transceiver RF front-end 212 includes various RF components, such as filters, an up-conversion module, a down-conversion module, a local oscillation module, low noise amplifiers and power amplifiers, as can be seen in FIG. 2. The transceiver baseband processing module 210 includes various transmitter and receiver processing modules, as can also be seen in FIG. 2.

The RFID reader 30, 32 includes antenna 160, RFID front-end 146, an RFID baseband processing module 220 and an RFID host interface 154. The RFID front-end 146 corresponds to the RF front-end 146 illustrated in FIG. 3. The RFID baseband processing module 220 includes various baseband processing components, such as encoding modules, decoding modules and protocol processing modules, as can be seen in FIG. 3.

The transceiver host interface 62 and RFID host interface 154 each provide a respective communication interface to the host processing module 50 of the host wireless communication device 22, 26. Thus, host processing module 50 provides outbound transceiver data to the transceiver 60 and receives inbound transceiver data from the transceiver 60 via the transceiver host interface 62. In addition, the host processing module 50 provides outbound RFID data to the RFID reader 30, 32 and receives inbound RFID data from the RFID reader 30, 32 via the RFID host interface 154. In one embodiment, the host processing module 50 includes a transceiver host processing module 230 for processing outbound and inbound transceiver data and an RFID host processing module 232 for processing outbound and inbound RFID data. The transceiver host processing module 230 and RFID host processing module 232 may be implemented as separate protocol blocks in software or as two separate processor chips. In another embodiment, the host processing module 50 is shared between the transceiver 60 and RFID reader 30, 32, as will be described in more detail below in connection with FIGS. 4B, 5 and 6.

The host processing module 50 is operable in two modes: a transceiver mode and an RFID mode. In transceiver mode, the host processing module 50 receives inbound transceiver data from and/or provides outbound transceiver data to the transceiver 60 via the transceiver host interface 62. In RFID mode, the host processing module 50 receives inbound RFID data from and/or provides outbound RFID data to the RFID reader 30, 32 via the RFID host interface 154. In one embodiment, the host processing module 50 operates in only one mode at a time. In other embodiments, the host processing module 50 is capable of simultaneously operating in both transceiver mode and RFID mode. For example, as shown in FIG. 4, the transceiver host processing module 230 and RFID host processing module 232 are capable of simultaneously communicating with the transceiver 60 and RFID reader 30, 32, respectively. As a result, transceiver data is able to be transmitted and/or received over antenna 86 while RFID data is being transmitted and/or received over antenna 160. In this way, the wireless communication device 22, 26 is equipped with RFID capabilities without disrupting normal transceiver operation.

The host processing module 50 further includes an interface 234 for enabling communication between the transceiver 60 and the RFID reader 30, 32. For example, the interface 234 enables RFID data captured by the RFID reader 30, 32 to be communicated to a network device, such as a base station, an access point and/or another wireless communication device, via transceiver 60. In addition, the interface 234 enables transceiver data received from a wireless network to be communicated to the RFID reader 30, 32. For example, the transceiver data may include signaling or other commands to the RFID reader 30, 32, or it may include data to be written via the RFID reader 30, 32 into an RFID tag.

In an exemplary operation, upon receiving an RF signal from one or more RFID tags at antenna 160, the RFID RF front-end 146 converts the received RF signal into a baseband signal, which is thereafter converted into a digital baseband signal. The digital baseband signal is provided to the RFID baseband processing module 220 to recapture RFID data therefrom in accordance with a particular RFID protocol used by the RFID tag that generated that RF signal. The RFID baseband processing module 220 may further process the RFID data to identify the object(s) associated with the RFID tag(s). The recovered RFID data is further provided to the RFID host processing module 232 via RFID host interface 154. Upon receiving the RFID data, the RFID host processing module 232 provides the RFID data to the transceiver host processing module 230 via interface 234. The transceiver host processing module 230 formats the RFID data in accordance with a particular wireless communication protocol associated with the transceiver 60 and provides the formatted RFID data to the transceiver baseband processing module 210 via the transceiver host interface 62. The transceiver baseband processing module 210 processes the formatted RFID data in accordance with a particular wireless communication standard (e.g., IEEE 802.11a, IEEE 802.11b, Bluetooth, etc.) to produce a digital near baseband signal. The digital near baseband signal is converted from the digital domain to the analog domain and provided to the transceiver RF front end 212 for up-conversion to produce an outbound RF signal that is transmitted by the antenna 86 to a network device, such as a base station, an access point and/or another wireless communication device.

Figure 4B:
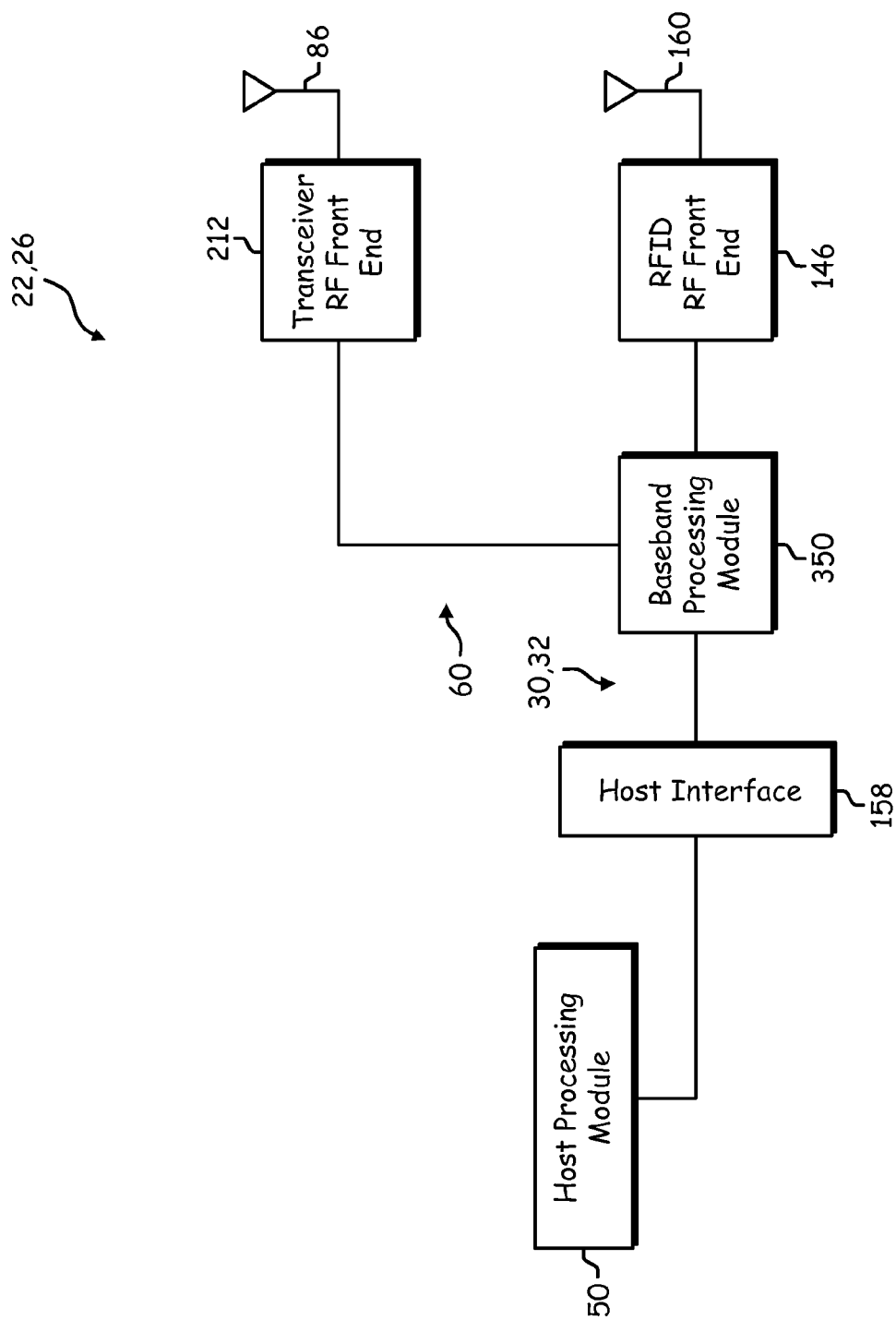
FIG. 4B is a schematic block diagram illustrating another exemplary wireless communication device incorporating both a transceiver and an RFID reader in accordance with the present invention.

FIG. 4B illustrates another exemplary wireless communication device 22, 26 in which the transceiver 60 and RFID reader 30, 32 are at least partially integrated in accordance with the present invention. As in FIG. 4A, the transceiver 60 includes antenna 86 and transceiver RF front-end 212, while RFID reader 30, 32 includes antenna 160 and RFID RF front end 146. However, the RFID reader 30, 32 and transceiver 60 share a common baseband processing module 350, a common host interface 158 and the host processing module 50.

The common baseband processing module 350 is operable in two modes: a transceiver mode and an RFID mode. In transceiver mode, the baseband processing module 350 processes inbound or outbound transceiver data, while in RFID mode, the baseband processing module 350 processes inbound or outbound RFID data. In one embodiment, the baseband processing module 350 operates in only one mode at a time. In other embodiments, the baseband processing module 350 is capable of simultaneously operating in both transceiver mode and RFID mode.

Host processing module 50 provides outbound transceiver data to the transceiver 60 and receives inbound transceiver data from the transceiver 60 via the common host interface 158. In addition, the host processing module 50 provides outbound RFID data to the RFID reader 30, 32 and receives inbound RFID data from the RFID reader 30, 32 via the common host interface 158.

In an exemplary operation, upon receiving an RF signal from one or more RFID tags at antenna 160, the RFID RF front-end 146 converts the received RF signal into a baseband signal, which is thereafter converted into a digital baseband signal. The digital baseband signal is provided to the common baseband processing module 350 to recapture RFID data therefrom in accordance with a particular RFID protocol used by the RFID tag that generated that RF signal. In one embodiment, the common baseband processing module 232 processes the RFID data to identify the object(s) associated with the RFID tag(s). In another embodiment, the common baseband processing module reformats the RFID data in accordance with a particular wireless communication protocol associated with the transceiver 60 and provides the formatted RFID data in the analog domain to the transceiver RF front end 212 for up-conversion to produce an outbound RF signal that is transmitted by the antenna 86 to a network device, such as a base station, an access point and/or another wireless communication device. In yet another embodiment, instead of or in addition to providing the RFID digital data to the transceiver RF front end 212 and/or processing the RFID digital data, the recovered RFID digital data is provided to the host processing module 50 via the common host interface 158 for further processing, storage and/or display.

Figure 5:
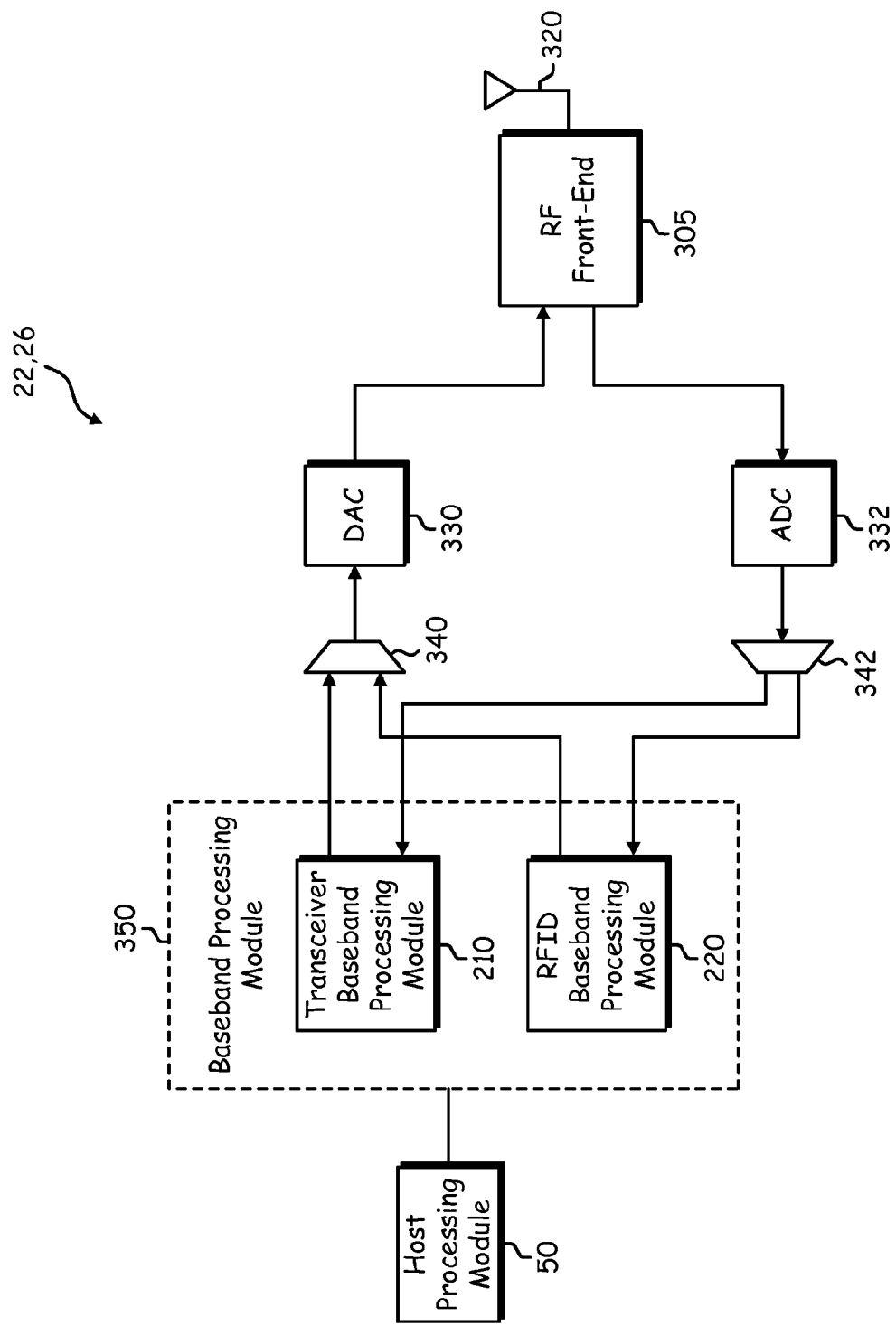
FIG. 5 is a schematic block diagram illustrating a wireless communication device having a transceiver integrated with an RFID reader in accordance with the present invention.

FIG. 5 is a schematic block diagram illustrating another exemplary wireless communication device 22, 26 in which the RFID reader functionality is integrated with the transceiver functionality. For example, as can be seen in FIG. 5, the RFID baseband processing module 220 and transceiver baseband processing module 210 are combined in baseband processing module 350. The transceiver baseband processing module 210 and RFID baseband processing module 220 may be implemented as separate protocol blocks in software or as two separate processor chips. In addition, the RFID baseband processing module 220 and transceiver baseband processing module 210 share the host processing module 50.

The combined baseband processing module 350 is operable in two modes: a transceiver mode and an RFID mode. In transceiver mode, the baseband processing module 350 processes inbound or outbound transceiver data, while in RFID mode, the baseband processing module 350 processes inbound or outbound RFID data. In one embodiment, the baseband processing module 350 operates in only one mode at a time. In other embodiments, the baseband processing module 350 is capable of simultaneously operating in both transceiver mode and RFID mode.

Furthermore, in FIG. 5, both the transceiver and RFID reader are shown sharing the RF front end 305, DAC 330, ADC 332 and antenna 320. The RF front end 305 is also operable in both transceiver mode and RFID mode. In transceiver mode, the RF front end 305 is operable to convert near baseband transceiver signals generated by the baseband processing module 350 into outbound RF transceiver signals for transmission via antenna 320 and to convert RF transceiver signals received via antenna 320 into inbound near baseband transceiver signals for transmission to the baseband processing module 350. In RFID mode, the RF front end 305 is operable to convert near baseband RFID signals generated by the baseband processing module 350 into outbound RF RFID signals for transmission via antenna 320 and to convert RF RFID signals received via antenna 320 into inbound near baseband RFID signals for transmission to the baseband processing module 350.

In an exemplary operation, upon receiving an RF signal from one or more RFID tags at antenna 320, the RF front-end 305 converts the received RF signal into a near baseband RFID signal, which is thereafter converted into a digital baseband RFID signal by ADC 332. The digital baseband RFID signal is provided to the RFID baseband processing module 220 within baseband processing module 350 via multiplexer 342 to recapture RFID data therefrom in accordance with a particular RFID protocol used by the RFID tag that generated that RF signal. The recovered RFID data is further provided to the host processing module 50. Upon receiving the RFID data, the host processing module 50 provides the digital RFID data to the transceiver baseband processing module 210 within the combined baseband processing module 350. The transceiver baseband processing module 210 processes the RFID data in accordance with a particular wireless communication protocol to produce a digital near baseband transceiver signal, and provides the digital near baseband transceiver signal to the DAC 330 via multiplexer 340 for conversion into an analog near baseband transceiver signal. The analog near baseband transceiver signal is provided to the RF front end 305 for up-conversion to produce an outbound RF transceiver signal that is transmitted by the antenna 320 to a network device, such as a base station, an access point and/or another wireless communication device.

Figure 6:
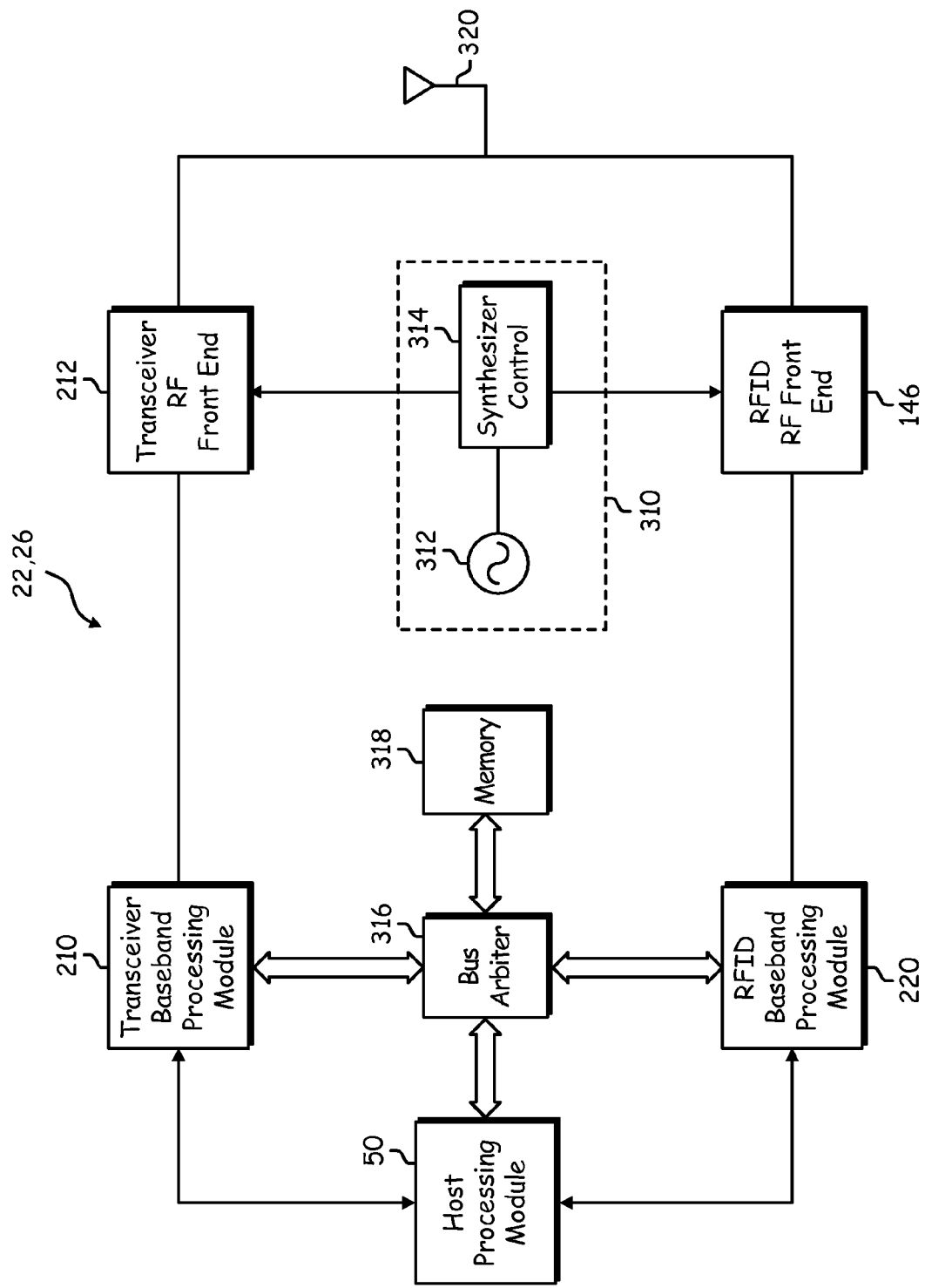
FIG. 6 is a schematic block diagram illustrating a wireless communication device with exemplary shared components between a transceiver and an RFID reader in accordance with the present invention.

FIG. 6 is a schematic block diagram illustrating yet another exemplary wireless communication device 22, 26 in which some components of the RFID reader are shared with the transceiver. For example, as can be seen in FIG. 6, the RFID baseband processing module 220 and transceiver baseband processing module 210 share the host processing module 50 and memory 318. Bus arbiter 316 facilitates access to the memory 318 by host processing module 50, RFID baseband processing module 220 and transceiver baseband processing module 210. In an exemplary operation, RFID data received by the host processing module 50 from the RFID baseband processing module 220 is stored in memory 318 via bus arbiter 316. The host processing module 50 provides the memory address of the stored RFID data to the transceiver baseband processing module 210 for use in retrieving the stored RFID data via bus arbiter 316.

In addition to the host processing module 50 and memory 318, the transceiver and RFID reader can further share a frequency synthesizer 310 and an antenna 320. The shared frequency synthesizer 310 includes a local oscillator 312 that is capable of generating in-phase (I) and quadrature (Q) RF carrier signals (hereinafter termed local oscillation signals) in multiple frequency bands and a synthesizer control 314 that selects a particular frequency band for input to either the transceiver RF front end 212 or RFID RF front end 146.

Figure 7:
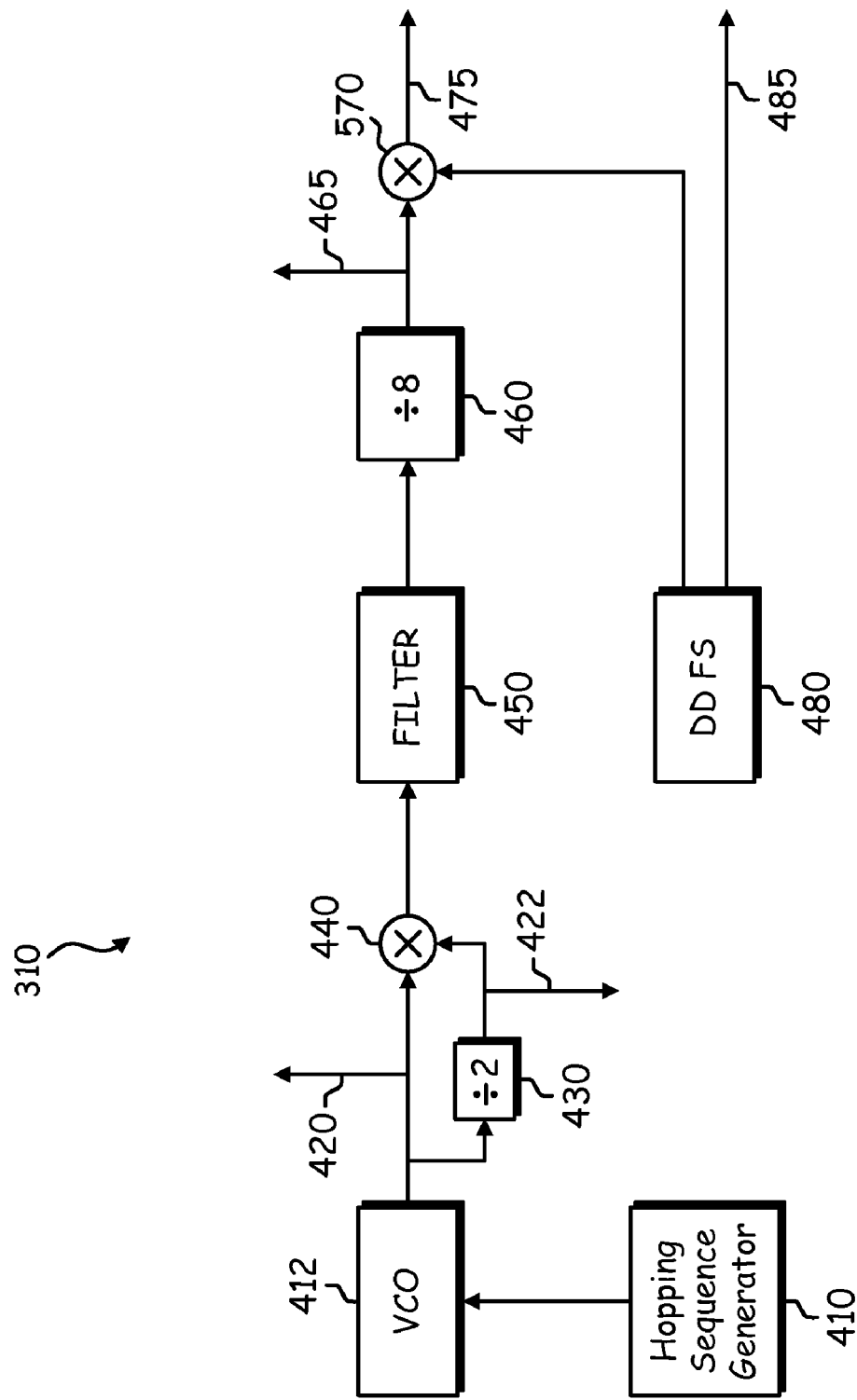
FIG. 7 is a schematic block diagram illustrating an exemplary multi-band synthesizer of the wireless communication device in accordance with the present invention.

FIG. 7 is a schematic block diagram of an exemplary multi-band synthesizer 310 in accordance with the present invention. The multi-band synthesizer 310 includes a voltage controlled oscillator (VCO) 412, a hopping sequence generator 410, a divide-by-2 block 430, a divide-by-8 block 460, a filter 450, multipliers 440 and 470 and a direct digital frequency synthesizer (DDFS) 480. The hopping sequence generator 410 controls the frequency output of the VCO 412. The output 420 produced by the VCO 412 is input to the divide-by-2 block 430 and multiplied by multiplier 440 to the output 422 of the divide-by-2 block 430. The output of the multiplier 440 is input to the filter 450, and the output of the filter 450 is input to the divide-by-8 block 460. The output 465 of the divideby-8 block 460 is input to the multiplier 470 for multiplication with the output of the DDFS 480.

The VCO 412, divide-by-two block 430, divide-by-8 block 460 and DDFS 480 allows the synthesizer 310 to easily generate in-phase (I) and quadrature (Q) carrier signals in multiple frequency bands. For example, RF carrier signals 420 in a first frequency band are produced by tapping the output of the VCO 412, RF carrier signals 422 in a second frequency band are produced by tapping the output of the divide-by-two block 430, RF carrier signals 465 in a third frequency band are produced by tapping the output of the divide-by-8 block 460, RF carrier signals 475 in a fourth frequency band are produced by tapping the output of the multiplier 470 and RF carrier signals 485 in a fifth frequency band are produced by tapping the output of the DDFS 480.

Figure 8:
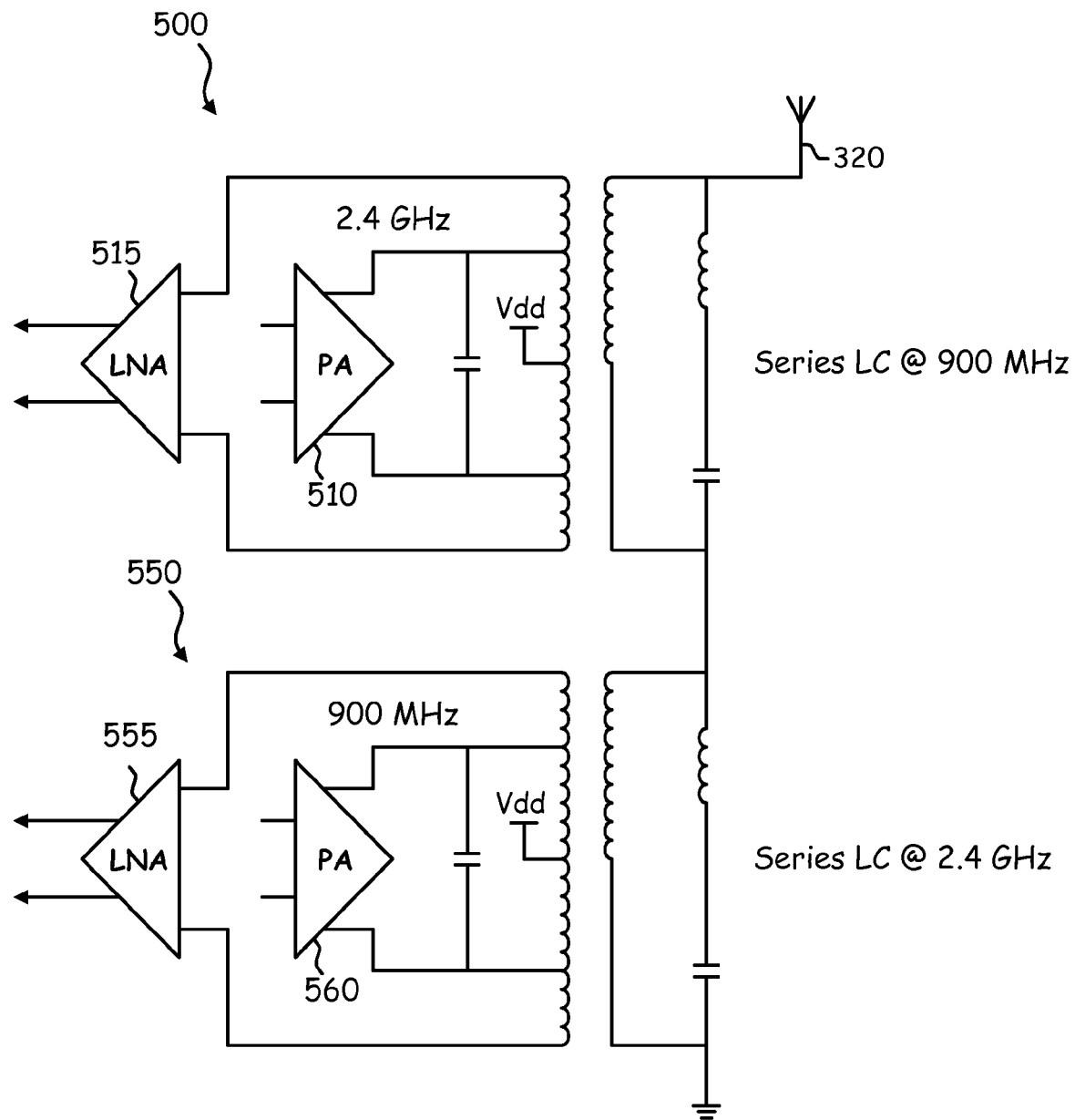
FIG. 8 is a schematic block diagram illustrating an exemplary shared antenna architecture of the wireless communication device in accordance with the present invention.

FIG. 8 is a schematic block diagram of an exemplary shared antenna architecture of the wireless communication device in accordance with the present invention. The shared antenna architecture includes a transceiver module 500 for operating in transceiver mode and an RFID module 550 for operating in RFID mode. The transceiver module 500 includes a power amplifier 510 and a low noise amplifier 515, while the RFID module 550 also includes a power amplifier 560 and a low noise amplifier 555. In transceiver mode, an analog signal from the transceiver baseband processing module is provided to the transceiver module 500. The analog signal is input to power amplifier 510 for amplification thereof. The amplified signal produces an RF signal at antenna 320. Likewise, in RFID mode, an analog signal from the RFID baseband processing module is provided to the RFID module 550. The analog signal is input to power amplifier 560 for amplification thereof. The amplified signal produces an RF signal at antenna 320. In a similar manner, when the antenna 320 receives an RF signal, in transceiver mode, the received RF signal is coupled to low noise amplifier 515, while in RFID mode, the received RF signal is coupled to low noise amplifier 555.

Figure 9:
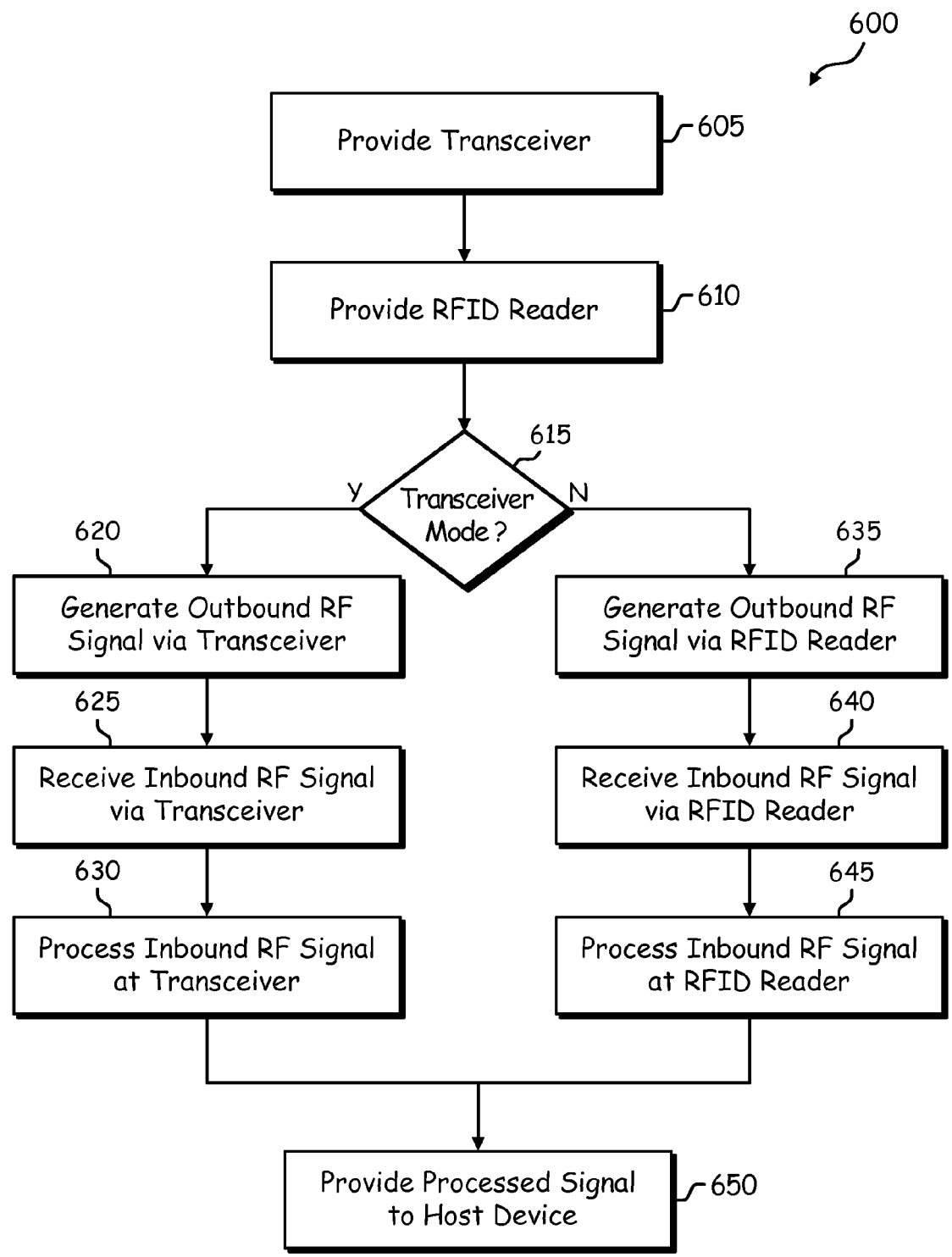
FIG. 9 is a logic diagram of a method for operating the wireless communication device in accordance with the present invention.

FIG. 9 is a logic diagram of a method 600 for operating the wireless communication device in accordance with the present invention. The process begins at steps 605 and 610, where a wireless communication device is provided with both a transceiver and an RFID reader. The process then proceeds to decision step 615, at which either transceiver mode or RFID mode is selected. If transceiver mode is selected (Y branch of step 615), the process proceeds to step 620, where an outbound RF signal is generated by the transceiver. The process then proceeds to steps 625 and 630, where an inbound RF signal is received and processed at the transceiver. However, if RFID mode is selected (N branch of step 615), the process proceeds to step 635, where an outbound RF signal is generated by the RFID reader. The process then proceeds to steps 640 and 645, where an inbound RF signal is received and processed at the RFID reader. The process ends at step 650, where the processed RF signal is provided by the transceiver or RFID reader to the host device.

FIG. 10A is a schematic block diagram illustrating an exemplary wireless communication device 22, 26 capable of simultaneously operating in transceiver mode and RFID mode using a shared antenna architecture in accordance with the present invention. Instead of using separate power amplifiers and low noise amplifiers for the transceiver and RFID reader, in FIG. 9, a power amplifier 760 and low noise amplifier 765 are shared by the transceiver and RFID reader. Power amplifier 760 and low noise amplifier 765 each represent one or more thereof. The transceiver produces a phase modulated RF signal 770, while the RFID reader produces an amplitude modulated RF signal 776. These two signals 770 and 776 can be combined by amplitude modulating the phase modulated RF signal 770 produced by the transceiver at the power amplifier 710 to produce a combined amplified outbound RF signal 772. The combined amplified outbound RF signal 772 can be transmitted via antenna 310 to RFID tags, other RFID readers and network devices, such as base stations, access points or other wireless communication devices.

At the receiving device, the received RF signal 710 is processed in accordance with the particular standard employed by the receiving device. For example, if the receiving device is an RFID tag, the RFID tag will ignore any phase modulation in the received RF signal and process only the amplitude modulated component of the received RF signal. Likewise, if the receiving device is a network device, the network device will ignore any amplitude modulation in the received RF signal and process only the phase modulated component of the received RF signal.

The wireless communication device is further capable of receiving a combined inbound RF signal 774 that includes both phase modulated component and an amplitude modulated component. The combined inbound RF signal 774 can be generated by a single device or multiple devices. For example, the combined inbound RF signal 774 can include both a phase modulated RF signal generated by a network device and an amplitude modulated RF signal generated by an RFID tag or another RFID reader. The combined inbound RF signal 774 is received at the low noise amplifier 765 and the resulting amplified combined inbound RF signal 775 is provided to both the transceiver RF front end 212 and the RFID RF front end 146. The transceiver front end 212 ignores the amplitude modulated component of the amplified combined inbound RF signal 775, converts any phase modulated component of the amplified combined inbound RF signal 775 to a near baseband signal and provides the near baseband signal to the transceiver baseband processing module 210 for further processing. In a similar manner, the RFID front end ignores the phase modulated component of the amplified combined inbound RF signal 775, converts any amplitude modulated component of the amplified combined inbound RF signal 775 to a near baseband signal and provides the near baseband signal to the RFID baseband processing module 220 for further processing.

FIG. 10B is a schematic block diagram illustrating another exemplary wireless communication device 22, 26 capable of simultaneously operating in transceiver mode and RFID mode using a shared antenna architecture in accordance with the present invention. Instead of amplitude modulating the phase modulated signal at the power amplifier 760, as shown in FIG. 10A, in FIG. 10B, an amplitude modulated signal 752 produced by the RFID baseband processing module 220 is combined with a phase modulated signal 750 produced by the transceiver baseband processing module 210 at baseband combiner 710. The combined baseband signal 755 is input to a shared transmitter RF front end 712 for up-conversion to produce a combined RF signal 715. The combined RF signal 715 is input to the power amplifier 760 to produce the combined amplified outbound RF signal 772, which is transmitted via shared antenna 320.

On the receiver side, when the antenna 320 receives a combined inbound RF signal 774 that includes both a phase modulated component and an amplitude modulated component, the combined inbound RF signal 774 is input to the low noise amplifier 765 and the resulting amplified combined inbound RF signal 775 is provided to a shared receiver RF front end 714. The shared receiver RF front end 714 converts the amplified combined inbound RF signal 775 to a near baseband signal 777 and provides the near baseband signal 777 to baseband splitter 720. The baseband splitter 720 separates the near baseband signal 777 into a phase modulated baseband signal 780 and an amplitude modulated baseband signal 782. The baseband splitter 710 further provides the phase modulated baseband signal 780 to the transceiver baseband processing module 210 for further processing and provides the amplitude modulated baseband signal 782 to the RFID baseband processing module 220 for further processing.

FIG. 10C is a schematic block diagram illustrating yet another exemplary wireless communication device 22, 26 capable of simultaneously operating in transceiver mode and RFID mode using a shared antenna architecture in accordance with the present invention. In FIG. 10C, the baseband processing modules and RF front ends are separated between the RFID reader and transceiver such that a phase modulated baseband signal 742 produced by transceiver baseband processing module 210 is input to a transmitter RF front end 732 of the transceiver for up-conversion to the phase modulated RF signal 770, and an amplitude modulated baseband signal 744 produced by RFID baseband processing module 220 is input to a transmitter RF front end 734 of the RFID reader for up-conversion to the amplitude modulated RF signal 776. The amplitude modulated RF signal 776 is combined with the phase modulated RF signal 770 at RF combiner 730. The combined RF signal 746 is input to the power amplifier 760 to produce the combined amplified outbound RF signal 772, which is transmitted via shared antenna 320.

On the receiver side, when the antenna 320 receives a combined inbound RF signal 774 that includes both a phase modulated component and an amplitude modulated component, the combined inbound RF signal 774 is input to the low noise amplifier 765 and the resulting amplified combined inbound RF signal 775 is provided to RF splitter 740, which separates the amplified combined inbound RF signal 775 into a phase modulated inbound RF signal 762 and an amplitude modulated inbound RF signal 764. The RF splitter 740 further provides the phase modulated inbound RF signal 762 to a receiver RF front end 236 of the transceiver for down-conversion to the phase modulated baseband signal 780. The RF splitter 740 further provides the amplitude modulated inbound RF signal 764 to a receiver RF front end 238 of the RFID reader for down-conversion to the amplitude modulated baseband signal 782.

FIG. 10D is a schematic block diagram illustrating an exemplary shared transmitter RF front end 712 capable of simultaneously operating in transceiver mode and RFID mode in accordance with the present invention. In FIG. 10D, the phase modulated baseband signal 742 produced by transceiver baseband processing module 210 and the amplitude modulated baseband signal 744 produced by RFID baseband processing module 220 is input to a shared transmitter RF front end 712. At the shared transmitter RF front end 712, the phase modulated baseband signal 742 is combined with the amplitude modulated baseband signal 744 at combiner 790 and the combined baseband signal 745 is mixed with a local oscillation signal at mixer 795 to up-convert the combined baseband signal 745 to the combined RF signal 746, which is provide to the power amplifier and antenna for amplification and transmission thereof A similar architecture can be used to implement a shared receiver RF front end for down-converting combined inbound RF signals, and separating the combined inbound baseband signal into its amplitude modulated and phase modulated components.

FIG. 11 is a logic diagram of a method 800 for simultaneously operating the wireless communication device in transceiver mode and RFID mode in accordance with the present invention. The method begins at step 805, where a wireless communication device is provided with a transceiver and RFID reader integrated by a shared antenna architecture. The process then proceeds to step 810, where a phase modulated outbound RF signal is generated by the transceiver. At step 815, the phase modulated outbound RF signal is amplitude modulated by the RFID reader to produce a combined outbound RF signal. The combined outbound RF signal may be transmitted via a shared antenna to RFID tags, other RFID readers and network devices.

The process then proceeds to step 820, where an inbound RF signal is received at the wireless communication device. The inbound RF signal may have both an amplitude modulated component generated by an RFID tag or RFID reader and a phase modulated component generated by a network device. The process then proceeds to steps 825, 830 and 840, where the inbound RF signal is amplified and provided to both the transceiver and the RFID reader within the wireless communication device. At step 835, the transceiver processes the amplified inbound RF signal to recover inbound transceiver digital data from the phase modulated component of the amplified inbound RF signal. Likewise, at step 845, the RFID reader processes the amplified inbound RF signal to recover inbound RFID digital data from the amplitude modulated component of the amplified inbound RF signal. The process ends at step 850, where the inbound digital data from both the transceiver and RFID reader are provided to the host device.

As one of ordinary skill in the art will appreciate, the term "substantially," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

The preceding discussion has presented a wireless communication device incorporating a low-cost RFID reader and method of operation thereof. As one of ordinary skill in the art will appreciate, other embodiments may be derived from the teaching of the present invention without deviating from the scope of the claims.

What is claimed is:

1. A wireless communication device including a radio frequency (RF) transceiver and a radio frequency identification system (RFID) reader, comprising:

a radio frequency (RF) front end operable, in a first mode, to generate a radio frequency identification system (RFID) outbound radio frequency (RF) signal and to receive an RFID inbound RF signal responsive to said RFID outbound RF signal, and operable in a second mode, to generate a transceiver outbound radio frequency (RF) signal and to receive a transceiver inbound RF signal;

a digitization module operable, in the first mode, to convert said RFID inbound RF signal into an RFID digital baseband signal, and operable, in the second mode, to convert said transceiver inbound RF signal into a transceiver digital baseband signal; and a baseband processing module coupled, in the first mode, to convert said RFID digital baseband signal into inbound RFID digital data, and coupled, in the second mode, to convert said transceiver digital baseband signal into inbound transceiver digital data.

2. The wireless communication device of claim 1, wherein said baseband processing module includes an RFID baseband processing module operable in the first mode and a transceiver baseband processing module operable in the second mode.

3. The wireless communication device of claim 1, wherein said RF front end includes an RFID RF front end operable in the first mode and a transceiver RF front end operable in the second mode.

4. The wireless communication device of claim 1, further comprising:
a memory operable to store said inbound RFID digital data and said inbound transceiver digital data.

5. The wireless communication device of claim 4, wherein said baseband processing module is operably coupled, in the first mode, to convert outbound RFID digital data into an outbound RFID digital baseband signal, and operably coupled, in the second mode, to convert outbound transceiver digital data into an outbound transceiver digital baseband signal, said digitization module is operable, in the first mode, to convert said outbound RFID digital baseband signal into an outbound RFID near baseband signal, and operable, in the second mode, to convert said outbound transceiver digital baseband signal into an outbound transceiver near baseband signal, said RF front end is operable, in the first mode, to convert said outbound RFID near baseband signal into an RFID outbound RF signal, and operable, in the second mode, to convert said outbound transceiver near baseband signal into a transceiver outbound RF signal, and wherein said memory is operable to store said outbound RFID digital data and said outbound transceiver digital data.

6. The wireless communication device of claim 4, further comprising:
a host processing module operably coupled to receive said inbound RFID digital data and said inbound transceiver digital data from said baseband processing module and store said inbound RFID digital data and said inbound transceiver digital data in said memory.

7. The wireless communication device of claim 6, wherein said baseband processing module further includes an RFID baseband processing module operable in the first mode and a transceiver baseband processing module operable in the second mode, and wherein said host processing module is further operable to provide said inbound RFID digital data to said transceiver baseband processing module from said memory.

8. The wireless communication device of claim 7, further comprising:
a bus arbiter operably coupled to said host processing module, said memory, said transceiver baseband processing module and said RFID baseband processing module to facilitate access to said memory.

9. The wireless communication device of claim 1, wherein said baseband processing module includes an RFID baseband processing module operable in the first mode and a transceiver baseband processing module operable in the second mode, and wherein said RFID baseband processing module and said transceiver baseband processing module are operably coupled to said digitization module via a multiplexer.

10. The wireless communication device of claim 1, further comprising:
an antenna coupled to said RF front end and operable in the first mode to transmit said RFID outbound RF signal and receive said RFID inbound RF signal, and operable in the second mode to transmit said transceiver outbound RF signal and receive said transceiver inbound RF signal.

11. The wireless communication device of claim 1, wherein said baseband processing module is programmed with multiple RFID protocols, and wherein said baseband processing module converts said RFID baseband digital signal into said inbound RFID digital data using a select one of said protocols.

12. The wireless communication device of claim 1, further comprising:
a frequency synthesizer operable to produce a signal at multiple frequencies and coupled to said RF front end to provide said signal at first one of said multiple frequencies in said first mode and at a second one of said multiple frequencies in said second mode;
wherein said RF front end is further operable to convert said RFID inbound RF signal to an RFID near baseband signal using said signal at said first one of said multiple frequencies and to convert said transceiver inbound RF signal to a transceiver near baseband signal using said signal at said second one of said multiple frequencies.

13. The wireless communication device of claim 12, wherein said RF front end further includes an RFID front end operable in the first mode and a transceiver front end operable in the second mode, and wherein said frequency synthesizer is operably coupled to said RFID RF front end to generate said RFID outbound RF signal at one of said multiple frequencies and operably coupled to said transceiver front end to generate said transceiver outbound RF signal at another of said multiple frequencies.

14. The wireless communication device of claim 1, wherein said digitization module includes an RFID digitization module operable in the first mode and a transceiver digitization module operable in the second mode.

15. A method for operating a wireless communication device, comprising:
providing the wireless communication device with a transceiver and an RFID reader;
generating a phase modulated outbound RF signal by the transceiver;
amplitude modulating the phase modulated outbound RF signal by the RFID reader to produce a combined outbound RF signal; and
transmitting the combined outbound RF signal via a shared antenna.

16. The method of claim 15, further comprising:
receiving an inbound RF signal at the wireless communication device, the inbound RF signal including an amplitude modulated component and a phase modulated component;
amplifying the inbound RF signal to produce an amplified inbound RF signal;
providing the amplified inbound RF signal to the transceiver and the RFID reader;
processing, by the transceiver, the amplified inbound RF signal to recover inbound transceiver digital data from the phase modulated component of the amplified inbound RF signal;
processing, by the RFID reader, the amplified inbound RF signal to recover inbound RFID digital data from the amplitude modulated component of the amplified inbound RF signal.

* * * * *